US005466550A

United States Patent [19]

Kanemaru et al.

[11] Patent Number: 5,466,550

[45] Date of Patent: Nov. 14, 1995

[54] ELECTROPHOTOGRAPHIC PHOTOSENSITIVE MEMBER AND ELECTROPHOTOGRAPHIC APPARATUS, DEVICE UNIT AND FACSIMILE MACHINE USING THE SAME

[75] Inventors: Tetsuro Kanemaru, Tokyo; Hideyuki Takai, Yokohama; Itaru Yamazaki, Kawasaki; Kazushi Iuchi, Yokohama, all of Japan

[73] Assignee: Canon Kabushiki Kaisha, Tokyo, Japan

[21] Appl. No.: 329,381

[22] Filed: Oct. 25, 1994

Related U.S. Application Data

[63] Continuation of Ser. No. 832,596, Feb. 7, 1992, abandoned.

[30] Foreign Application Priority Data

Feb. 8, 1991 [JP] Japan .................................... 3-037907

[51] Int. Cl.[6] ........................................................ C08G 5/14

[52] U.S. Cl. ................................ 430/58; 430/60; 430/62; 430/64; 355/211

[58] Field of Search .................................. 430/58, 60, 62, 430/64; 355/211

[56] References Cited

U.S. PATENT DOCUMENTS

| | | | |
|---|---|---|---|
| 3,837,851 | 9/1974 | Shattuck et al. . | |
| 3,871,882 | 3/1975 | Wiedemann . | |
| 4,717,636 | 1/1988 | Takahashi et al. | 430/58 |

FOREIGN PATENT DOCUMENTS

| | | |
|---|---|---|
| 0224738 | 6/1987 | European Pat. Off. . |
| 2580830 | 10/1980 | France . |
| 62-30254 | 2/1987 | Japan . |
| 2062533 | 3/1990 | Japan . |

OTHER PUBLICATIONS

Patent Abstracts of Japan, vol. 11, No. 395 (P-650) [2842] Dec. 24, 1987.

World Patents Index Latest, Week 1990, AN 90-145162 (19).

World Patents Index Latest, Week 1590, AN 90-111854 (15).

*Primary Examiner*—Joseph L. Schofer

*Assistant Examiner*—John M. Cooney, Jr.

*Attorney, Agent, or Firm*—Fitzpatrick, Cella, Harper & Scinto

[57] ABSTRACT

An electrophotographic photosensitive member has a conductive support, and a charge generating layer and a charge transporting layer. The charge generating layer contains an acetal resin obtained from a reaction of polyvinyl alcohol, alkyl aldehyde having a structure shown in Formula (1) below, and aryl aldehyde having a structure shown in Formula (2) below:

$$R\text{—}CHO \quad (1)$$

wherein R is a substituted or unsubstituted, chain or cyclic alkyl group, and $$Ar\text{—}CHO \quad (2)$$

wherein Ar is a substituted or unsubstituted aryl group. The electrophotographic photosensitive member is used in electrophotographic apparatus, device units and facsimile machines, while ensuring superior electrophotographic characteristics and an excellent image free from fog.

19 Claims, 1 Drawing Sheet

ELECTROPHOTOGRAPHIC PHOTOSENSITIVE MEMBER AND ELECTROPHOTOGRAPHIC APPARATUS, DEVICE UNIT AND FACSIMILE MACHINE USING THE SAME

This application is a continuation of application Ser. No. 07/832,596 filed Feb. 7, 1992, now abandoned.

BACKGROUND OF THE INVENTION

1. Field of the Invention

The present invention relates to an electrophotographic photosensitive member having a photosensitive layer of the function separated type, and more particularly to an electrophotographic photosensitive member having a charge generating layer which contains a particular resin, as well as an electrophotographic apparatus, a device unit and a facsimile machine using the photosensitive member.

2. Related Background Art

To date, there have been proposed and practiced so-called many electrophotographic photosensitive members of layer-laminated type that are separated in function to a charge generating layer and a charge transporting layer. These photosensitive members are superior in sensitivity, charge retainability and surface strength to the photosensitive members which precede the former and have a photosensitive layer of single layer type (see, for example, U.S. Pat. No. 3,837,851 and U.S. Pat. No. 3,871,882).

In the electrophotographic photosensitive member of the layer-laminated type, charge carriers generated upon light being absorbed by the charge generating layer are injected into the charge transporting layer and moved to the surface of the photosensitive member to neutralize charges on the surface of the photosensitive member, thereby producing an electrostatic contrast. The role borne by the charge generating layer in the above process is very important. Stated otherwise, the charge generating layer affects electrophotographic characteristics to a quite large extent in points such as how many and evenly the charge carriers are generated, how efficiently the generated charge carriers are injected into the charge transporting layer, and how smoothly opposite charge carriers are transported into a support. The charge generating layer usually consists of an organic pigment which serves as a charge generating material and a binder resin as a binding agent. In general, the weight percentage of the binder resin with respect to the organic pigment is not too low, i.e., on the order of 25 to 200 wt. %. It is accordingly thought that the binder resin in the charge generating layer operates as a very serious influence upon movement of the generated charge carriers. Thus, the basic structure, functional group, molecular weight, purity and other properties of the binder resin greatly influence electrophotographic characteristics such as sensitivity, potential level and durability. Judging from prior references and patent publications, however, the binder resin in the charge generating layer has been mainly recognized as merely an aid for the organic pigment as a charge generating material and it is enough if it is able to provide dispersibility, bonding ability and mechanical strength. A butyral resin, for example, is widely used as the binder resin because of good dispersibility for the pigment, but the electrophotographic characteristics of a photosensitive member using the butyral resin are not always satisfactory from the point of residual potential, potential fluctuations and photomemory, taking into account the recent demand for higher image quality. Further, by using a benzal resin produced from substituted or unsubstituted aryl aldehyde and polyvinyl alcohol, as disclosed in Japanese Patent Laid-Open No. 62-30254, there can be obtained better characteristics in sensitivity, residual potential, and photomemory than in the case of using a butyral resin. However, the benzal resin generally has poorer dispersibility than the butyral resin and may cause background fog on an image or picture when used as a binder for the charge generating layer of the photosensitive member for laser beam printers, thus requiring more improvement. Additionally, in the case of using both a butyral resin and a benzal resin in mixed fashion, these resins act independently of each other, which may rather deteriorate the total characteristics.

SUMMARY OF THE INVENTION

An object of the present invention is to provide an electrophotographic photosensitive member containing a novel binder resin and having superior electrophotographic characteristics.

Another object of the present invention is to provide an electrophotographic photosensitive member which can offer an excellent image, free from fog.

Still another object of the present invention is to provide an electrophotographic apparatus, a device unit and a facsimile machine using the above electrophotographic photosensitive member.

Specifically, the present invention provides an electrophotographic photosensitive member, comprising a conductive support, and a charge generating layer and a charge transporting layer both formed thereon, said charge generating layer containing an acetal resin obtained from a reaction of polyvinyl alcohol, alkyl aldehyde having a structure shown in Formula (1) below, and aryl aldehyde having a structure shown in Formula (2) below:

$$R—CHO \qquad (1)$$

wherein R is a substituted or unsubstituted, chain or cyclic alkyl group, and $$Ar—CHO \qquad (2)$$

wherein Ar is a substituted or unsubstituted aryl group.

The present invention further provides an electrophotographic apparatus, a device unit and a facsimile machine having the electrophotographic photosensitive member.

DETAILED DESCRIPTION OF THE PREFERRED EMBODIMENTS

Figure 1:
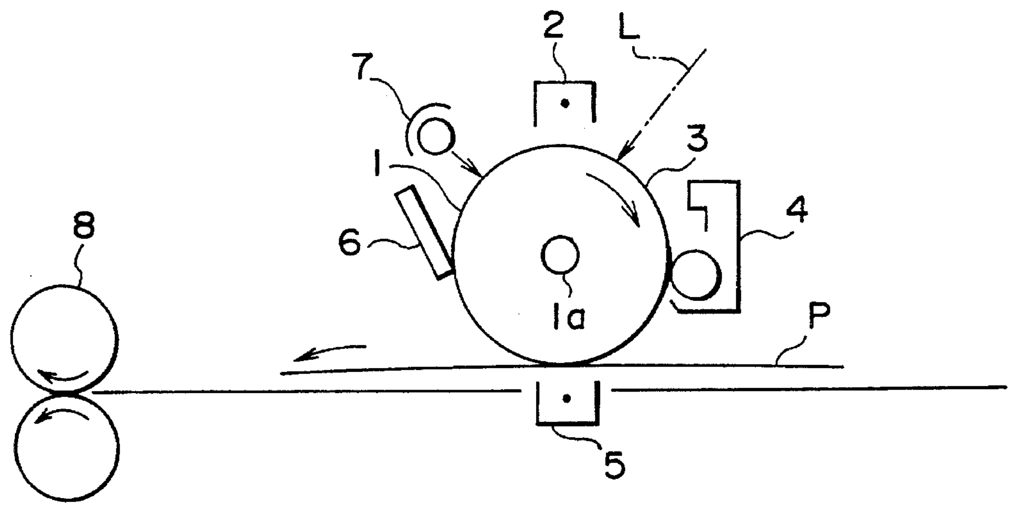
FIG. 1 is a schematic view showing one example of arrangement of a photographic apparatus having an electrophotographic photosensitive member of the present invention.

The present invention resides in an electrophotographic photosensitive member that has a charge generating layer containing an acetal resin obtained from a reaction of polyvinyl alcohol, alkyl aldehyde having a structure shown in Formula (1) below, and aryl aldehyde having a structure shown in Formula (2) below:

R—CHO (1)

wherein R is a substituted or unsubstituted, chain or cyclic alkyl group, and

Ar—CHO (2)

wherein Ar is a substituted or unsubstituted aryl group.

In the Formula (1), examples of the alkyl group are such groups as methyl, ethyl, propyl, isopropyl, n-butyl, and cyclohexyl. Of these examples, propyl and cyclohexyl groups are preferable.

In the Formula (2), examples of the aryl group are such groups as phenyl, naphthyl, anthryl, pyrenyl, phenanthryl, and azulenyl.

Examples of the substituent are a halogen atom, an alkyl group (such as methyl, ethyl, propyl, isopropyl, n-butyl, t-butyl, and 2-methoxymethyl) that may contain a substituent, an aralkyl group (such as benzyl, phenethyl, chlorobenzyl, and bromobenzyl) that may contain a substituent, an aryl group (such as phenyl, tolyl, chlorophenyl, and naphthyl) that may contain a substituent, an alkoxy group (such as methoxy, ethoxy, and propoxy), an aryloxy (such as phenoxy and naphthoxy), a substituted amino group (such as dimethylamino, diethylamino, piperidino, morpholino and pyrrolidino), a nitro group, and a cyano group. The substituent may be plural in number. Of these examples, a halogen atom and a nitro group are preferable.

The weight-average molecular weight of the polyvinyl acetal resin having a particular structure, for use in the present invention, is preferably in a range of 10,000 to 200,000, more preferably in a range of 30,000 to 80,000. The acetal forming rate, or degree of acetalization is preferably not less than 50 mol %, more preferably in a range of 65 to 90 mol %. In addition, while the content of a component of residual vinyl acetate, which the polyvinyl alcohol contains inherently is preferably as low as possible, the degree of saponification of the polyvinyl alcohol is preferably not less than 85 mol %.

The reason why a potential level and other characteristics of the electrophotographic photosensitive member of the present invention which is obtained by laminating a charge generating layer, containing the aforesaid polyvinyl acetal resin, and a charge transporting layer on a conductive support, present is not yet clear theoretically. However, the reason is believed to be as follows. When used in mixed fashion, a butyral resin and a benzal resin act independently of each other and thus adverse portions of the respective characteristics appear separately. On the other hand, when a butyral group and a benzal group are present in one molecule, the pigment is covered with both the groups in a well balanced state so that their adverse characteristics are canceled out.

An acetal structure portion of the polyvinyl acetal resin for use in the present invention is shown below by way of examples, but is not limited thereto.

Basic Structure:

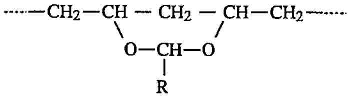

-continued

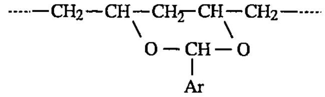

| | | |
|---|---|---|
| Resin Example 1 | R: $-CH_3$ | Ar: 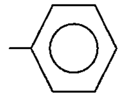 |
| Resin Example 2 | R: $-C_2H_6$ | Ar: 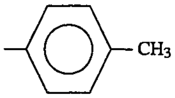 |
| Resin Example 3 | R: $-C_3H_7$ | Ar: 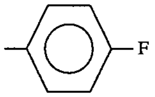 |
| Resin Example 4 | R: $-C_3H_7$ | Ar: 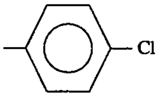 |
| Resin Example 5 | R: $-C_3H_7$ | Ar: 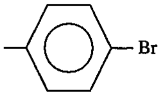 |
| Resin Example 6 | R: $-C_3H_7$ | Ar: 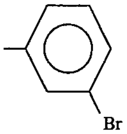 |
| Resin Example 7 | R: $-C_3H_7$ | Ar: 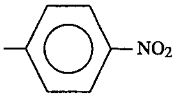 |
| Resin Example 8 | R: $-C_3H_7$ | Ar: 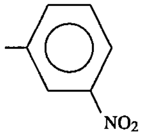 |
| Resin Example 9 | R: $-C_3H_7$ | Ar: 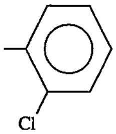 |
| Resin Example 10 | R: $-C_3H_7$ | Ar: 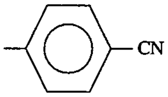 |
| Resin Example 11 | R: $-C_3H_7$ | Ar: 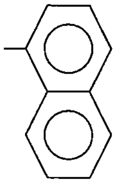 |

-continued

Resin Example 12 R: $-C_3H_7$

Ar: 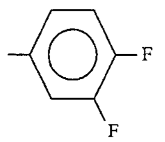

Resin Example 13 R: $-C_3H_7$

Ar: 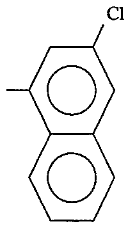

Resin Example 14 R: $-C_3H_7$

Ar: 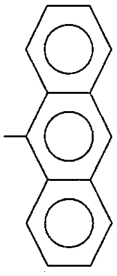

Resin Example 15 R: $-C_3H_7$

Ar: 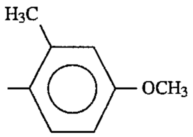

Resin Example 16 R: $-C_3H_7$

Ar: 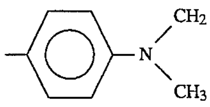

Resin Example 17

R: 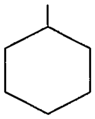

Ar: 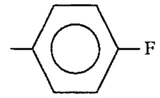

Among the above, the resin examples 3, 4, 5, 6, 7, 8, 9, 12 and 17 are preferable and, of these, the resin examples 3, 7, 8, 12 and 17 are particularly preferable.

The polyvinyl acetal resin for use in the present invention can be easily synthesized by reacting polyvinyl alcohol with any of the above aldehydes in a mixed solvent, for example, consisting of methanol and benzene, in the presence of an acid such as hydrochloric acid and sulfuric acid at temperatures of 20° to 70° C.

Synthesis Example (Synthesis of Resin Example 1)

After putting a mixed solution of methanol of 200 g and chlorobenzene of 200 g in a 3-liter, three-necked flask, polyvinyl alcohol of 50 g (degree of polymerization; 1000, degree of saponification; 98.5±0.5 mol %, supplied by K. K. Kuraray) and butyl aldehyde of 520 g were added to the solution while agitating it. Then, after dropping concentrated hydrochloric acid of 4.2 g, the solution was agitated for 10 hours while keeping the reaction temperature in a range of 35° to 38° C. Following the reaction, the reaction solution was injected into a solution prepared by dissolving sodium hydroxide of 3.9 g into methanol of 10 liter, and the precipitated resin was filtered and washed with water. The precipitated resin was then refined by dropping it into a 2-liter mixed solution of acetone/benzene=1/1 for reprecipitation. The resin thus obtained was taken out through filtration and dried under a reduced pressure. The yield was 79 g.

Measuring the butyral forming rate, or degree of butyralization of the above resin in conformity with Japanese Industrial Standards K-6728 (method of testing polyvinyl butyral), it was 45 mol %.

Next, after putting the above butyral resin of 50 g into a mixed solution of methanol of 250 g and dichloromethane of 250 g, p-bromobenzaldehyde of 300 g was added to the solution while agitating it, and then concentrated hydrochloric acid of 4.2 g was dropped thereinto, followed by agitation for 40 hours while keeping the reaction temperature in a range of 45° to 50° C. Following the reaction, the reaction solution was injected into a solution prepared by dissolving sodium hydroxide of 3.7 g into methanol of 20 liter, and the precipitated resin was filtered and washed with water. The precipitated resin was then refined by dissolving it into chloroform of 200 g and dropping it into methanol of 3 liter for reprecipitation. The resin thus obtained was taken out through filtration and dried under a reduced pressure. The yield was 80 g.

Measuring the benzal forming rate, or degree of benzalization of the above resin in conformity with the similar method to the foregoing and subtracting the above butyral forming rate from the measured result, the net benzal forming rate was 35 mol %.

Moreover, any other type of polyvinyl acetal resin for use in the present invention can also be synthesized likewise using the above-stated method. When condensing an aldehyde with polyvinyl alcohol, either one of alkyl aldehyde and substituted aryl aldehyde may first be condensed, or they may be condensed at the same time.

In the electrophotographic photosensitive member of the present invention, the binder resin in the charge generating layer must not impair movement of charge carriers generated in the layer as far as possible. For this purpose, the content (wt. %) of the binder resin in the charge generating layer is preferably as low as possible. In consideration of bonding ability and stability of pigment dispersion, however, the content of the binder resin is preferably not less than 20 wt. % for the total layer weight, more preferably in a range of 25 to 90 wt. %, most preferably in a range of 28 to 50 wt. %. Note that, in the present invention, the binder resin defined above may be used as a mixture with any of other known binder resins.

The charge generating layer of the electrophotographic photosensitive member of the present invention can be formed by preparing a solution in which an inorganic or organic pigment selected from among charge generating materials, such as selenium, selenium-tellurium, cadmium sulfide, amorphous silicon, pyrylium, thiopyrylium, azulenium-base dye, phthalocyanine-base pigment, anthanthrone pigment, dibenzpyrenequinone pigment, pyranthrone pigment, trisazo pigment, disazo pigment, monoazo pigment, indigo pigment, quinacridone-base pigment, unsymmetrical quinocyanine-base pigment and quinocyanine-base pigment, is dispersed into the binder resin of the present invention or a mixture of the present binder resin and any other known binder resin using an appropriate solvent, and by coating and then drying the solution thus prepared.

Examples of the above solvent are ketones such as acetone, methyl ethyl ketone and cyclohexanone; amides such as N, N-dimethylformamide and N,N-dimethylacetamide; sulfoxides such as dimethylsulfoxide; ethers such as tetrahydrofuran, dioxane and ethylene glycol monomethyl ether; esters such as methyl acetate and ethyl acetate; aliphatic hydrocarbon halides such as chloroform, methylene chloride, dichloroethylene, carbon tetrachloride and trichloroethylene; or aromatic compounds such as benzene, toluene, xylene, ligroin, chlorobenzene and dichlorobenzene.

The dispersion is performed by dispersing the charge generating material into the binder resin using the solvent while pulverizing them into a predetermined particle size by means of a sand mill, ball mill, roll mill or attriter.

Drying of the coated film after the application is preferably performed by first exposing the film at room temperature, while checking the nature of the dried state with a finger, followed by drying under heating. The drying under heating is preferably performed for a period of 5 minutes to 2 hours at 30° to 200° C. The film thickness is preferably not greater than 5 μm, more preferably in a range of 0.01 to 1 μm.

The charge transporting layer of the electrophotographic photosensitive member of the present invention is laminated on or under the charge generating layer, and has a function of receiving charge carriers from the charge generating layer in the presence of an electric field and transporting the charge carriers. The charge transporting layer is formed by dissolving a charge transporting material into a solvent along with an appropriate binder resin, if necessary, and by coating and then drying the resultant solution. The film thickness is preferably in a range of 5 to 40 μm, more preferably in a range of 15 to 30 μm.

The charge transporting material is grouped into an electron transportable material and a hole transportable material: Examples of the electron transportable material are electron attractable materials such as 2,4,7-trinitrofluorenone, 2,4,5,7-tetranitrofluorenone, chloranil and tetracyanoquinodimethane, and the polymerized form of any of those electron attractable materials. Examples of the hole transportable material are polycyclic aromatic compounds such as pyrene and anthracene; heterocyclic compounds such as compounds based on carbazole, indole, imidazole, oxazole, thiazole, oxadiazole, pyrazole, pyrazoline, thiadiazole and triazole; hydrazone-base compounds such as p-diethylaminobenzaldehyde-N,N-diphenylhydrazone and N,N-diphenylhydrazino-3-methylidene-9-ethylcarbazole; styryl-base compounds such as α-phenyl-4'-N,N-diphenylaminostilbene and 5-[4-(di-p-tolylamino)benzylidene]-5H-dibenzo-[a,d]-cycloheptene; benzidine-base compounds; triarylmethane-base compounds; and polymers (such as poly-N-vinyl-carbazole and polyvinylanthracene) having triphenylamine or a group resulting from among those compounds as a main or side chain. Besides the above organic charge transporting materials, inorganic materials such as selenium, selenium-tellurium, amorphous silicon and cadmium sulfide may also be used. These charge transporting materials can be used solely or in combination of two or more. When the charge transporting material has no a film forming ability, an appropriate binder can be used additionally. Practical examples of the binder are insulating resins such as acrylic resin, polyarylate, polyester, polycarbonate, polystyrene, acrylonitrile-styrene copolymer, polyacrylamide, polyamide and chlorinated rubber, or organic photoconductive polymers such as poly-N-vinylcarbazole and polyvinylanthracene.

Examples of the conductive support for use in the present inveniton are metals or alloys such as aluminum, aluminum alloy, copper, zinc, stainless steel, vanadium, molybdenum, chromium, titanium, nickel, indium, gold and platinum. Alternatively, the conductive support may be one formed by coating any of those metals or alloys on a plastic base (such as formed of polyethylene, polypropylene, polyvinyl chloride, polyethylene terephthalate and acrylic resin) with the vacuum deposition method, one formed by coating conductive particles (such as carbon black and silver particles) on a plastic or metallic base along with-an appropriate binder resin, or one formed by impregnating a plastic or paper base with conductive particles.

Although the conductive support may be in the form of a sheet, drum or belt, the support is preferably formed into a shape optimum for the electrophotographic apparatus in which it is employed.

In the present invention, an undercoating layer which has a barrier function and a bonding function may be provided between the conductive support and the photosensitive layer. Materials of the undercoating layer include, for example, casein, polyvinyl alcohol, nitrocellulose, polyamides (such as nylon 6, nylon 66, nylon 610, copolymer nylon and alkoxymethylated nylon), polyurethane, and aluminum oxide. The film thickness of the undercoating layer is preferably not greater than 5 μm, more preferably in a range of 0.1 to 3 μm.

Furthermore, in the present invention, a layer of resin alone or a resin layer containing conductive particles may be provided, as a protective layer, on the photosensitive layer.

Each of the above-mentioned layers can be applied by using any desired coating method such as immersion coating, spray coating, spinner coating, beads coating, Meyer bar coating, blade coating, roller coating or curtain coating.

The electrophotographic photosensitive member of the present invention, in which the above-defined particular acetal resin is used as the binder resin in the charge generating layer, has advantages of providing higher sensitivity, ensuring stability of potentials in light and dark areas when used repeatedly, and effectively improving a photomemory characteristic. Incidentally, the term "photomemory" means such a phenomenon that a potential of the area subjected to light irradiation before the charging step is lowered as compared to the potential of the area not subjected to the light irradiation before charging and, as a result, the former area is caused to appear white (or black) on the image.

The electrophotographic photosensitive member of the present invention is applicable to not only electrophotographic copying machines, but also a wide field of electrophotographic applications such as a laser beam printer, CRT printer, LED printer, liquid crystal printer and laser printing.

FIG. 1 shows a schematic diagram of a transfer type electrophotographic apparatus employing the electrophotographic photosensitive member of the present invention.

In FIG. 1, a drum type photosensitive member 1 serves as an image carrier, being driven to rotate around the axis 1*a* in the arrow direction at a predetermined peripheral speed. The photosensitive member 1 is charged positively or negatively at the peripheral face uniformly during the rotation by an electrostatic charging means 2, and then exposed to image-exposure light L (e.g. slit exposure, laser beam-scanning exposure, etc.) at the exposure portion 3 with an image-exposure means (not shown in the figure), whereby electrostatic latent images are sequentially formed on the peripheral surface in accordance with the exposed image.

The electrostatic latent image is developed with a toner by a developing means 4, and the toner-developed images are sequentially transferred by a transfer means 5 onto a surface of a transfer-receiving material P which is fed between the photosensitive member 1 and the transfer means 5 synchronously with the rotation of the photosensitive member 1 from a transfer-receiving material feeder not shown in the figure.

The transfer-receiving material P having received the transferred image is separated from the photosensitive member surface, and introduced to an image fixing means 8 for fixation of the image and sent out from the copying machine as a copy.

The surface of the photosensitive member 1, after the image transfer, is cleaned with a cleaning means 6 to remove any residual un-transferred toner, and is treated for charge-elimination with a pre-exposure means 7 for repeated use for image formation.

The generally and usually employed charging means 2 for uniformly charging the photosensitive member 1 is a corona charging apparatus. The generally and usually employed transfer means 5 is also a corona transfer means. In the electrophotographic apparatus, two or more of the constitutional elements of the above described photosensitive member, the developing means, the cleaning means, etc. may be integrated into one apparatus unit, which may be made mountable to, or demountable from the main body of the apparatus. For example, at least one of a charging means, a developing means, and a cleaning means is combined with the photosensitive member into one unit mountable to, or demountable from the main body of the apparatus by aid of a guiding means such as a rail of the main body of the apparatus. A charging means and/or a developing means may be combined with the aforementioned apparatus unit.

In the case where the electrophotographic apparatus is used as a copying machine or a printer, the optical image exposure light L is projected onto the photosensitive member as reflected light or transmitted light from an original, or alternatively, it is projected onto the photosensitive member by reading an original and signalizing information with a sensor and then scanning with a laser beam, driving an LED array, or driving a liquid crystal shutter array according to the signal.

Figure 2:
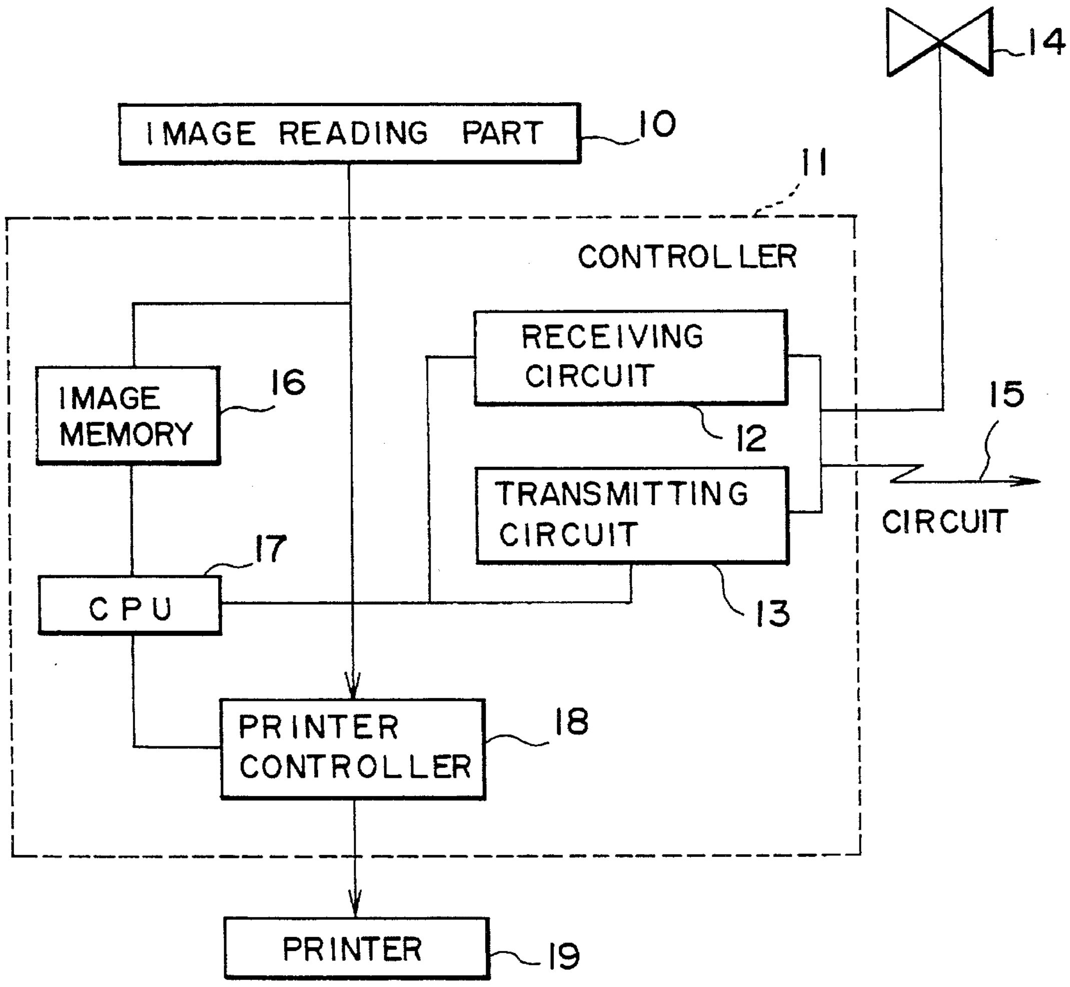
FIG. 2 is a block diagram showing one example of a facsimile machine having the electrophotographic photosensitive member of the present invention.

In the case where the electrophotographic apparatus is used as a printer of a facsimile apparatus, the optical image exposure light L is for printing the received data. FIG. 2 is a block diagram of an example of this case.

A controller 11 controls an image reading part 10 and a printer 19. The whole of the controller 11 is controlled by a CPU 17. Readout data from the image reading part is transmitted through a transmitting circuit 13 to the other communication station. Data received from the other communication station is transmitted through a receiving circuit 12 to a printer 19. The image data is stored in image memory. A printer controller 18 controls a printer 19. The numeral 14 denotes a telephone set.

The image received through a circuit 15, namely image information from a remote terminal connected through the circuit, is demodulated by the receiving circuit 12, treated for decoding of the image information in CPU 17, and successively stored in the image memory 16. When at least one page of image information has been stored in the image memory 16, the images of that page are recorded. The CPU 17 reads out the one page of image information from the memory 16, and sends out the decoded one page of image information to the printer controller 18. The printer controller 18 controls the printer 19 on receiving the one page of image information from CPU 17 to record the image information.

Incidentally the CPU 17 receives the following page of information while recording is conducted by the printer 19.

Images are received and recorded in the manner as described above.

The present invention is described in more detail by reference to examples.

EXAMPLE 1

50 parts (weight parts, this being true below) of titanium oxide powder coated with tin oxide containing antimony oxide of 10%, 25 parts of resol type phenol resin, 20 parts of methyl cellosolve, 5 parts of methanol, and 0.002 part of silicone oil (polydimethylsiloxane—polyoxyalkylene copolymer, weight-average molecular weight; 3,000) were dispersed for 2.5 hours by a sand mill using glass beads of 1 mm diameter, thereby preparing a coating solution for a conductive layer. The coating solution was applied onto an aluminum support by using a Meyer bar and dried for 35 minutes at 140° C. to form a conductive layer with a thickness of 30 μm.

A solution prepared by dissolving 5 parts of methoxymethylated nylon (weight-average molecular weight; 32,000) and 10 parts of alcohol-soluble copolymer nylon (weight-average molecular weight; 29,000) into 95 parts of methanol, was coated thereon by using a Meyer bar to form an undercoating with a thickness of 1 μm after drying.

Next, 5 parts of phthalocyanine pigment having the following structure was added to a solution prepared by dissolving 3 parts of above Resin Example 5 of the polyvinyl acetal resin (acetalization degree; 80 mol %, weight-average molecular weight; 40,000) into 90 parts of cyclohexanone, followed by dispersion for 10 hours using an attriter. The resultant dispersion solution was coated on the undercoating layer, formed previously, by using a Meyer bar so as to provide a thickness of 0.3 μm after drying, and then dried at 90° C. to form a charge generating layer.

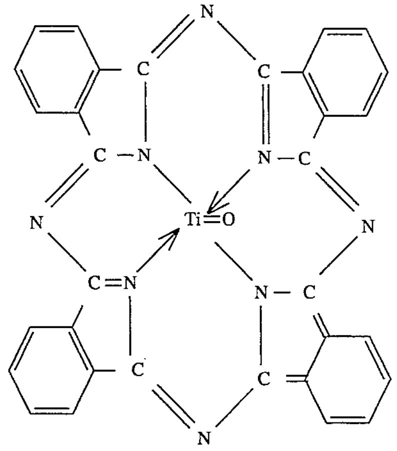

Next, 5 parts of styryl compound having the following structure:

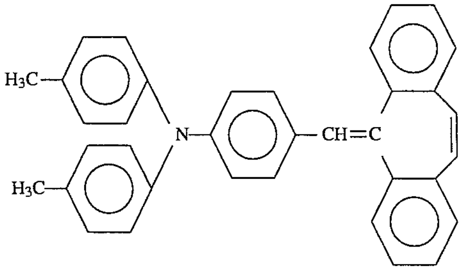

and 5 parts of polycarbonate resin (trade name; Panlite L-1250, by Teijin Chemicals K.K., number-average molecular weight: 100,000) were dissolved into 70 parts of chlorobenzene. The solution was coated on the charge generating layer by using a Meyer bar so as to provide a thickness of 18 μm after drying, and then dried to form a charge transporting layer.

Using an electrostatic copying paper test unit (Model SP-428, by Kawaguchi Electric K.K.), the photosensitive member thus obtained was corona-charged at −5 KV in a static manner, held in a dark place for 10 seconds, and exposed to light at a luminous intensity of 5 lux for thereby measuring charging characteristics. As the charging characteristics, the surface potential $V_O$ of the photosensitive member, the exposure amount E ½ necessary for reducing by half the potential as resulted after a dark-decay for 10 seconds in a dark place, i.e., the sensitivity, and the residual potential $V_r$ were measured. Also, a photomemory characteristic was evaluated by exposing the photosensitive member to light at luminous intensity of 600 lux for 3 minutes, leaving it in a dark place for 1 minute, measuring the surface potential $V'_O$ of the photosensitive member again in the same manner as the above, and then calculating the difference between $V'_O$ and the above $V_O$, i.e., $|V_O - V'_O|$.

Moreover, the photosensitive member was pasted onto a cylinder adapted for a photosensitive drum of a laser beam printer of reversing development type that repeats the process of charging—exposure—development—transfer—cleaning at cycle of 1.5 seconds, and image formation was actually carried out thereon under circumstances at normal temperature and normal humidity (23° C., 50 %RH) and at high temperature and high humidity (30° C., 85 %RH), followed by visually evaluating fog and black-spotted defects (black dots) on the image obtained.

Additionally, the dispersion solution for the charge generating layer was left at the room temperature and dispersed conditions of the pigment after 6, 12, 24, 48 and 192 hours were visually observed.

The results are listed in Table 1.

COMPARATIVE EXAMPLE 1

An electrophotographic photosensitive member was fabricated and evaluated exactly in the same manner as Example 1 except that a commercially available butyral resin (trade name BM-2, by Sekisui Chemicals, K.K.) was used in place of above Example 5 of the polyvinyl acetal resin used in Example 1.

The results are listed in Table 1.

COMPARATIVE EXAMPLE 2

An electrophotographic photosensitive member was fabricated and evaluated exactly in the same manner as Example 1 except that a benzal resin (benzalization degree; 80 mol %, weight-average molecular weight; 50,000) having the following structure was used in place of above Resin Example 5 of the polyvinyl acetal resin used in Example 1.

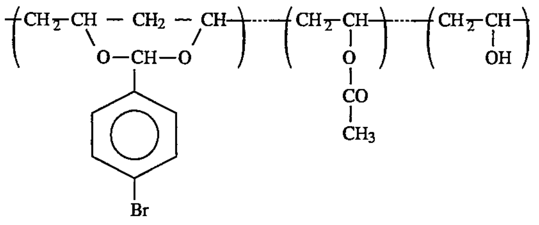

The results are listed in Table 1.

TABLE 1

| | Acetalization Degree (mol %) | | Charging Characteristics | | | |
|---|---|---|---|---|---|---|
| | Butyralization | Benzalization | $V_0$ (−V) | E½ (lux · sec) | $V_r$ (−V) | $\|V_0-V'_0\|$ (V) |
| Example 1 | 45 | 35 | 705 | 1.2 | 20 | 30 |
| Comparative Example 1 | 68 | — | 700 | 2.5 | 90 | 70 |
| Comparative Example 2 | — | 80 | 690 | 1.3 | 30 | 35 |

| | Evaluation of Image | | Dispersed Condition | | | | |
|---|---|---|---|---|---|---|---|
| | N/N | H/H | after 6 h | after 12 h | after 24 h | after 48 h | after 192 h |
| Example 1 | good | good | even | even | even | even | even |
| Comparative Example 1 | good | good | even | even | even | even | even |
| Comparative Example 2 | fog | black dots, fog | slight coagulation | coagulation | coagulation | coagulation | coagulation |

EXAMPLE 2

50 parts of titanium oxide powder coated with tin oxide containing antimony oxide of 10%, 25 parts of resol type phenol resin, 20 parts of methyl cellosolve, 5 parts of methanol, and 0.002 part of silicone oil (polydimethylsiloxane—polyoxyalkylene copolymer, weight-average molecular weight; 3,000) were dispersed for 2 hours by a sand mill using glass beads of 1 mm diameter, thereby preparing a coating solution for a conductive layer. The coating solution was applied onto an aluminum support by using a Meyer bar and dried for 30 minutes at 145° C. to form the conductive layer with a thickness of 30 μm.

A solution prepared by dissolving 5 parts of methoxymethylated nylon (weight-average molecular weight; 32,000) and 9 parts of alcohol-soluble copolymer nylon (weight-average molecular weight; 29,000) into 97 parts of methanol, was coated thereon by using a Meyer bar to form an undercoating with a thickness of 1 μm after drying.

Next, 5 parts of pigment having the following structure was added to a solution prepared by dissolving 3 parts of about Resin Example 8 of the polyvinyl acetal resin (acetalization degree; 75 mol %, weight-average molecular weight; 50,000) into 90 parts of cyclohexanone, followed by dispersion for 10 hours using an attriter. The resultant dispersion solution was coated on the undercoating layer, formed previously, by using a Meyer bar so as to provide a thickness of 0.3 μm after drying, and then dried at 70° C. to form a charge generating layer.

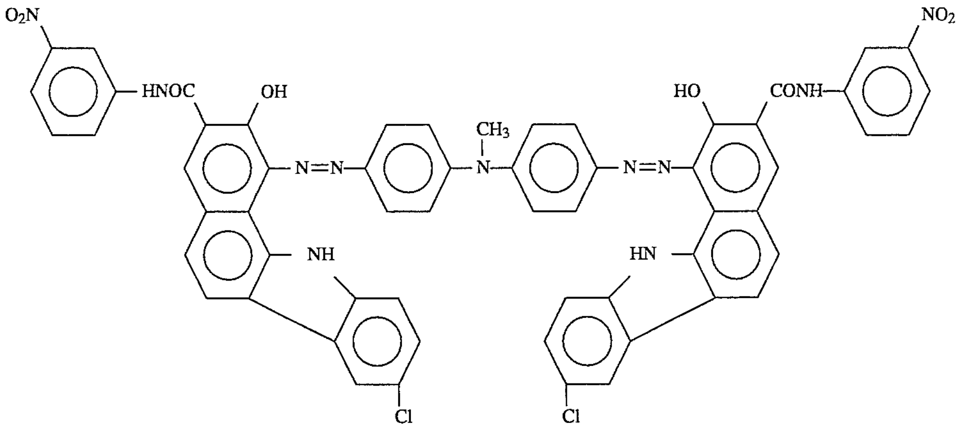

Next, 5 parts of hydrazone compound having the following structure;

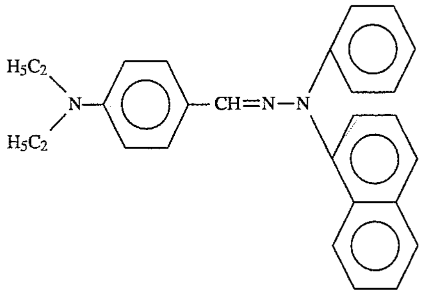

and 5 parts of polycarbonate resin (trade name: Panlite L-1250, by Teij in Chemicals K.K., number-average molecular weight; 100,000) were dissolved into 70 parts of chlorobenzene. The solution was coated on the charge generating layer by using a Meyer bar so as to provide a thickness of 18 μm after drying, and then dried to form a charge transporting layer.

The electrophotographic photosensitive member thus obtained was evaluated in the same manner as Example 1.

The results are listed in Table 2.

COMPARATIVE EXAMPLE 3

An electrophotographic photosensitive member was fabricated and evaluated exactly in the same manner as Example 2 except that a commercially available butyral resin (trade name BM-1, by Sekisui Chemicals, K.K.) was used in place of the above Resin Example 8 of the polyvinyl acetal resin used in Example 2.

The results are listed in Table 2.

COMPARATIVE EXAMPLE 4

An electrophotographic photosensitive member was fabricated and evaluated exactly in the same manner as Example 2 except that a benzal resin (benzalization degree; 75 mol %, weight-average molecular weight; 45,000) having the following structure was used in place of above Resin Example 8 of the polyvinyl acetal resin used in Example 2.

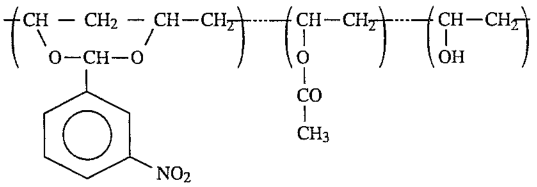

The results are listed in Table 2.

TABLE 2

| | Acetalization Degree (mol %) | | Charging Characteristics | | | |
|---|---|---|---|---|---|---|
| | Butyralization | Benzalization | $V_0$ (−V) | E½ (lux · sec) | $V_r$ (−V) | $\lvert V_0-V'_0\rvert$ (V) |
| Example 2 | 39 | 36 | 680 | 2.1 | 10 | 40 |
| Comparative Example 3 | 66 | — | 685 | 4.9 | 70 | 55 |
| Comparative Example 4 | — | 75 | 700 | 2.2 | 20 | 45 |

| | Evaluation of Image | | Dispersed Condition | | | | |
|---|---|---|---|---|---|---|---|
| | N/N | H/H | after 6 h | after 12 h | after 24 h | after 48 h | after 192 h |
| Example 2 | good | good | even | even | even | even | even |
| Comparative Example 3 | good | good | even | even | even | even | even |
| Comparative Example 4 | slight fog | black dots, fog | even | partial coagulation | coagulation | coagulation | coagulation |

EXAMPLES 3 to 9

Electrophotographic-photosensitive members were fabricated and evaluated exactly in the same manner as Example 1 except that, in place of above Resin Example 5 of the polyvinyl acetal resin used in Example 1, Resin Example 3 (acetalization degree; 73 mol %, weight-average molecular weight; 35,000), Resin Example 4 (acetalization degree; 82 mol %, weight-average molecular weight; 42,000), Resin Example 6 (acetalization degree; 79 mol %, weight-average molecular weight; 60,000), Resin Example 7 (acetalization degree; 65 mol %, weight-average molecular weight; 54,000), Resin Example 10 (acetalization degree; 75 mol %, weight-average molecular weight; 45,000), Resin Example 11 (acetalization degree; 80 mol %, weight-average molecular weight; 50,000), and Resin Example 12 (acetalization degree; 82 mol %, weight-average molecular weight; 56,000) were used.

The results are listed in Table 3.

TABLE 3

| | Acetalization Degree (mol %) | | Charging Characteristics | | | | Evaluation of Image | | Dispersed Condition | | | | |
|---|---|---|---|---|---|---|---|---|---|---|---|---|---|
| | Butyralization | Benzalization | $V_0$ (−V) | E½ (lux · sec) | $V_r$ (−V) | $\lvert V_0-V'_0\rvert$ (V) | N/N | H/H | after 6 h | after 12 h | after 24 h | after 48 h | after 192 h |
| Example 3 | 29 | 44 | 705 | 2.2 | 20 | 20 | good | good | even | even | even | even | even |
| Example 4 | 35 | 47 | 695 | 2.3 | 15 | 30 | good | good | even | even | even | even | even |
| Example 5 | 40 | 39 | 700 | 2.4 | 10 | 25 | good | good | even | even | even | even | even |
| Example 6 | 44 | 21 | 685 | 2.1 | 10 | 25 | good | good | even | even | even | even | even |
| Example 7 | 47 | 28 | 690 | 2.3 | 15 | 25 | good | good | even | even | even | even | even |
| Example 8 | 50 | 30 | 710 | 2.0 | 10 | 30 | good | good | even | even | even | even | even |
| Example 9 | 55 | 27 | 695 | 2.3 | 15 | 15 | good | good | even | even | even | even | even |

EXAMPLE 10

50 Parts of titanium oxide powder coated with tin oxide containing antimony oxide of 10%, 25 parts of resol type phenol resin, 20 parts of methyl cellosolve, 5 parts of methanol, and 0.002 part of silicone oil (polydimethylsiloxane—polyoxyalkylene copolymer, weight-average molecular weight; 3,000) were dispersed for 2 hours by a sand mill using glass beads of 1 mm diameter, thereby preparing a coating solution for a conductive layer. The coating solution was applied onto an aluminum support by using a Meyer bar and dried for 30 minutes at 140° C. to form the conductive layer with a thickness of 30 μm.

A solution prepared by dissolving 5 parts of methoxymethylated nylon (weight-average molecular weight; 32,000) and 10 parts of alcohol-soluble copolymer nylon (weight-average molecular weight; 29,000) into 95 parts of methanol, was coated thereon by using a Meyer bar to form an undercoating with a thickness of 1 μm after drying.

Next, 5 parts of pigment having the following structure was added to a solution prepared by dissolving 3 parts of above Resin Example 9 of the polyvinyl acetal resin (acetalization degree; 81 mol %, weight-average molecular weight; 58,000) into 90 parts of cyclohexanone, followed by dispersion for 10 hours using an attriter. The resultant dispersion solution was coated on the undercoating layer, formed previously, by using a Meyer bar so as to provide a thickness of 0.3 μm after drying, and then dried at 70° C. to form a charge generating layer.

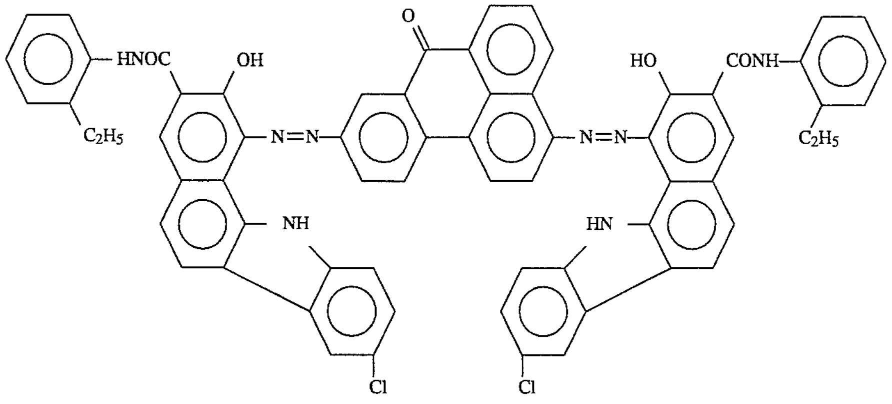

Next, 5 parts of fluorine compound having the following structure;

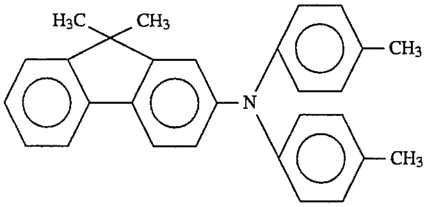

and 5 parts of polycarbonate resin (trade name: Panlite L-1250, by Teijin Chemicals K.K., number-average molecular weight; 100,000) were dissolved into 70 parts of chlorobenzene. The solution was coated on the charge generating layer by using a Meyer bar so as to provide a thickness of 18 μm after drying, and then dried to form a charge transporting layer.

The electrophotographic photosensitive member thus obtained was evaluated in the same manner as Example 1.

The results are listed in Table 4.

COMPARATIVE EXAMPLE 5

An electrophotographic photosensitive member was fabricated and evaluated exactly in the same manner as Example 10 except that a solution prepared by dissolving 1.5 parts of commercially available butyral resin (trade name BM-2, by Sekisui Chemicals, K.K.) and 1.5 parts of benzal resin (benzal forming rate; 75 mol %, weight-average molecular weight; 4,000) having the following structure into 90 parts of THF was used as a binder solution for the charge generating layer in place of above Resin Example 9 of the polyvinyl acetal resin used in Example 10.

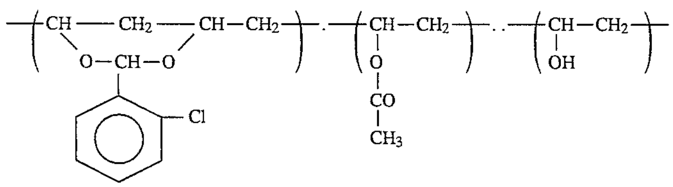

The results are listed in Table 4.

TABLE 4

| | Acetalization Degree (mol %) | | Charging Characteristics | | | |
|---|---|---|---|---|---|---|
| | Butyrali-zation | Benzali-zation | $V_0$ (−V) | E½ (lux · sec) | $V_r$ (−V) | $\lvert V_0 - V'_0 \rvert$ (V) |
| Example 10 | 42 | 39 | 705 | 2.1 | 15 | 25 |
| Comparative Example 5 | 68 | 75 | 680 | 3.0 | 45 | 30 |

| | Evaluation of Image | | Dispersed Condition | | | | |
|---|---|---|---|---|---|---|---|
| | N/N | H/H | after 6 h | after 12 h | after 24 h | after 48 h | after 192 h |
| Example 10 | good | good | even | even | even | even | even |
| Comparative Example 5 | slight fog | slight fog | even | even | slight coagulation | coagulation | coagulation |

As will be understood from the foregoing results, the photosensitive member using the resin of the present invention, i.e., the resin having the particular structure, as a binder resin for the charge generating layer is superior in charging characteristics, image quality and stability of the used dispersion solution to the photosensitive member using one of a butyral resin and a polyvinyl acetal resin solely or both of them in mixed fashion.

Further, there can also be obtained the smaller advantage in an electrophotographic apparatus, a device unit and a facsimile machine which employ the present photosensitive member.

What is claimed is:

1. An electrophotographic photosensitive member, comprising a conductive support and a photosensitive layer thereon, said photosensitive layer having a charge generating layer and a charge transporting layer, said charge generating layer containing an acetal resin obtained from a reaction of polyvinyl alcohol, alkyl aldehyde having a structure shown in Formula (1) below, and aryl aldehyde having a structure shown in Formula (2) below:

R—CHO (1)

wherein R is a substituted or unsubstituted propyl group or a cyclohexyl group, and Ar—CHO (2)

wherein Ar is an aryl group substituted by a halogen atom or a nitro group.

2. An electrophotographic photosensitive member according to claim 1, wherein said electrophotographic photosensitive member has an intermediate layer between said conductive support and said photosensitive layer.

3. An electrophotographic photosensitive member according to claim 1, wherein said electrophotographic photosensitive member has a protective layer on said photosensitive layer.

4. An electrophotographic apparatus, comprising an electrophotographic photosensitive member, electrostatic latent image forming means, means for developing a formed electrostatic latent image, and means for transferring a developed image onto a transfer material;

said electrophotographic photosensitive member, comprising a conductive support and a charge generating layer and a charge transporting layer both formed thereon, said charge generating layer containing an acetal resin obtained from a reaction of polyvinyl alcohol, alkyl aldehyde having a structure shown in Formula (1) below, and aryl aldehyde having a structure shown in Formula (2) below:

R—CHO (1)

wherein R is a propyl group or a cyclohexyl group, and

Ar—CHO (2)

wherein Ar is an aryl group substituted by a halogen atom or a nitro group.

5. A device unit, comprising an electrophotographic photosensitive member, charging means and cleaning means;

said electrophotographic photosensitive member, comprising a conductive support, and a charge generating layer and a charge transporting layer both formed thereon, said charge generating layer containing an acetal resin obtained from a reaction of polyvinyl alcohol, alkyl aldehyde having a structure shown in Formula (1) below and aryl aldehyde having a structure shown in Formula (2) below:

R—CHO (1)

wherein R is a propyl group or a cyclohexyl group, and

Ar—CHO (2)

wherein Ar is an aryl group substituted by a halogen atom or a nitro group said unit supporting said electrophotographic photosensitive member, said charging means and said cleaning means as one integral structure and being detachably attached to a device body.

6. A device unit according to claim 5, wherein said unit includes developing means.

7. A facsimile machine, comprising an electrophotographic apparatus and receiving means for image information from a remote terminal;

said electrophotographic apparatus including an electrophotographic photosensitive member, said electrophotographic photosensitive member, comprising a conductive support and a charge generating layer and a charge transporting layer both formed thereon, said charge generating layer containing an acetal resin obtained from a reaction of polyvinyl alcohol, alkyl aldehyde having a structure shown in Formula (1) below, and aryl aldehyde having a structure shown in Formula (2) below:

R—CHO (1)

wherein R is a propyl group or a cyclohexyl group, and

Ar—CHO (2)

wherein Ar is an aryl group substituted by a halogen atom or a nitro group.

8. An electrophotographic photosensitive member, comprising a conductive support and a photosensitive layer thereon, said photosensitive layer having a charge generating layer and charge transporting layer, said charge generating layer containing a polyvinyl acetal resin having structures represented by the formulas (A) and B below:

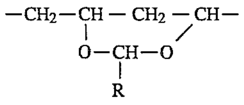
(A)

wherein R is a substituted or unsubstituted propyl group or a cyclohexyl group, and

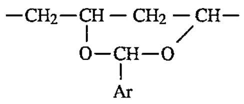
(B)

wherein Ar is an aryl group substituted by a halogen atom or a nitro group.

9. An electrophotographic apparatus, comprising an electrophotographic photosensitive member, electrostatic latent image forming means, means for developing a formed electrostatic latent image, and means for transferring a developed image onto a transfer material;

said electrophotographic photosensitive member, comprising a conductive support and a photosensitive layer thereon, said photosensitive layer having a charge generating layer and a charge transporting layer, said charge generating layer containing a polyvinyl acetal resin having structures represented by the formulas (A) and (B) below:

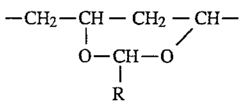
(A)

wherein R is a substituted or unsubstituted propyl group or a cyclohexyl group, and

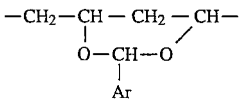
(B)

wherein Ar is an aryl group substituted by a halogen atom or a nitro group.

10. A device unit, comprising an electrophotographic photosensitive member, charging means and cleaning means;

said electrophotographic photosensitive member comprising a conductive support and a photosensitive layer thereon, said photosensitive layer having a charge generating layer and a charge transporting layer, said charge generating layer containing a polyvinyl acetal resin having structures represented by the formulas (A) and (B) below:

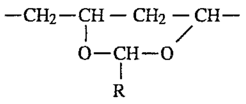
(A)

wherein R is a substituted or unsubstituted propyl group or a cyclohexyl group, and

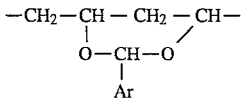
(B)

wherein Ar is an aryl group substituted by a halogen atom or a nitro group, said unit supporting said electrophotographic photosensitive member, said charging means and said cleaning means as one integral structure and being detachable attached to a device body.

11. A facsimile machine, comprising an electrophotographic apparatus and receiving means for image information from a remote terminal;

said electrophotographic apparatus including an electrophotographic photosensitive member, said electrophotographic photosensitive member, comprising a conductive support and a charge generating layer and a charge transporting layer both formed thereon, said charge generating layer containing a polyvinyl acetal resin having structures represented by the formulas (A) and (B) below:

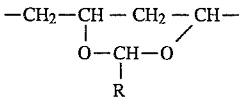
(A)

wherein R is a substituted or unsubstituted propyl group or a cyclohexyl group, and

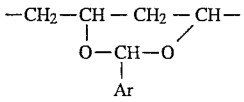
(B)

wherein Ar is an aryl group substituted by a halogen atom or a nitro group.

12. The electrophotographic photosensitive member according to claim 1, wherein said Ar is a phenyl group substituted by a halogen atom or a nitro group.

13. The electrophotographic apparatus according to claim 4, wherein said Ar is a phenyl group substituted by a halogen atom or a nitro group.

14. The device unit according to claim 5, wherein said Ar is a phenyl group substituted by a halogen atom or a nitro group.

15. The facsimile machine according to claim 7, wherein said Ar is a phenyl group substituted by a halogen atom or a nitro group.

16. The electrophotographic photosensitive member according to claim 8, wherein said Ar is a phenyl group substituted by a halogen atom or a nitro group.

17. The electrophotographic apparatus according to claim 9, wherein said Ar is a phenyl group substituted by a halogen atom or a nitro group.

18. The device unit according to claim 10, wherein said Ar is a phenyl group substituted by a halogen atom or a nitro group.

19. The facsimile machine according to claim 11, wherein said Ar is a phenyl group substituted by a halogen atom or a nitro group.

* * * * *

UNITED STATES PATENT AND TRADEMARK OFFICE

CERTIFICATE OF CORRECTION

PATENT NO. : 5,466,550

DATED : November 14, 1995

INVENTOR(S) : TETSURO KANEMARU, ET AL.

It is certified that error appears in the above-identified patent and that said Letters Patent is hereby corrected as shown below:

ON TITLE PAGE

In [56] References Cited, under FOREIGN PATENT DOCUMENTS: "2062533" should read --2-62533--.

COLUMN 1

Line 15, "function separated" should read --function-separated--.

COLUMN 2

Line 30, "member," should read --member--.
Line 52, "a photographic" should read --an electrophotographic--.

COLUMN 3

Line 45, "present" should read --at present--.
Line 51, "well" should read --well- --.

COLUMN 8

Line 4, "with-an" should read --with an--.
Line 25, "beads" should read --bead--.

COLUMN 13

Line 3, "about" should read --above--.
Line 33, "structure;" should read --structure:--.
Line 48, "Teij in" should read --Teijin--.

UNITED STATES PATENT AND TRADEMARK OFFICE

CERTIFICATE OF CORRECTION

PATENT NO. : 5,466,550

DATED : November 14, 1995

INVENTOR(S) : TETSURO KANEMARU, ET AL.

It is certified that error appears in the above-identified patent and that said Letters Patent is hereby corrected as shown below:

COLUMN 15

Line 28, "Electrophotographic-photosensitive" should read --Electrophotographic photosensitive--.

COLUMN 17

Line 20, "structure;" should read --structure:--.
Line 51, "4,000)" should read --44,000)--.

COLUMN 19

Line 29, "smaller" should read --similar--.
Line 48, "Ar—CHO (2)" should read --Ar—CHO (2)--.
Line 65, "member," should read --member--.

COLUMN 20

Line 36, "member," should read --member--.
Line 51, "group" should read --group;--.
Line 64, "member," should read --member--.

COLUMN 21

Line 39, "member," should read --member--.

UNITED STATES PATENT AND TRADEMARK OFFICE

CERTIFICATE OF CORRECTION

PATENT NO. : 5,466,550

DATED : November 14, 1995

INVENTOR(S) : TETSURO KANEMARU, ET AL.

It is certified that error appears in the above-identified patent and that said Letters Patent is hereby corrected as shown below:

COLUMN 22

Line 23, "detachable" should read --detachably--.
Line 31, "member," should read --member--.

Signed and Sealed this

Ninth Day of April, 1996

Attest:

BRUCE LEHMAN

Attesting Officer

*Commissioner of Patents and Trademarks*